United States Patent
De Ambroggi et al.

(10) Patent No.: US 8,383,937 B2
(45) Date of Patent: Feb. 26, 2013

(54) AUXILIARY SUPPORT CASE FOR AT LEAST ONE PIECE OF ELECTRICAL EQUIPMENT

(75) Inventors: Renato De Ambroggi, Cocquio Trevisago (IT); Enrico Pianezzola, Luvinate (IT)

(73) Assignee: BTICINO S.p.A., Milan (IT)

( * ) Notice: Subject to any disclaimer, the term of this patent is extended or adjusted under 35 U.S.C. 154(b) by 888 days.

(21) Appl. No.: 11/914,531

(22) PCT Filed: May 12, 2006

(86) PCT No.: PCT/IT2006/000354
§ 371 (c)(1),
(2), (4) Date: May 16, 2008

(87) PCT Pub. No.: WO2007/000783
PCT Pub. Date: Jan. 4, 2007

(65) Prior Publication Data
US 2009/0211803 A1    Aug. 27, 2009

(30) Foreign Application Priority Data

May 17, 2005  (IT) .............................. MI2005A0895

(51) Int. Cl.
*H01H 9/02*        (2006.01)
(52) U.S. Cl. ............ 174/58; 174/63; 248/27.3; 248/906

(58) Field of Classification Search .................. 248/314, 248/343, 906, 309.1, 246.03, 346.04, 27.1, 248/27.3; 174/50.51, 50.54, 53, 54, 57, 58, 174/63, 480, 504, 50.52; 220/3.2, 3.3, 3.5, 220/3.6, 3.9; 439/597, 598, 131, 136, 571
See application file for complete search history.

(56) References Cited

U.S. PATENT DOCUMENTS

| | | | | |
|---|---|---|---|---|
| 4,295,018 | A * | 10/1981 | Borrelli | 200/51.09 |
| 5,452,175 | A * | 9/1995 | Tsai | 361/643 |
| 5,594,208 | A * | 1/1997 | Cancellieri et al. | 174/58 |
| 6,376,770 | B1 * | 4/2002 | Hyde | 174/58 |
| 6,533,225 | B1 * | 3/2003 | Berges et al. | 248/27.1 |
| 6,561,822 | B2 * | 5/2003 | Depp et al. | 439/76.2 |
| 6,737,576 | B1 * | 5/2004 | Dinh | 174/50 |
| 7,279,635 | B2 * | 10/2007 | Hyde | 174/58 |
| 7,318,732 | B2 * | 1/2008 | Kidman | 439/136 |
| 7,731,130 | B2 * | 6/2010 | Decanio et al. | 248/27.3 |

FOREIGN PATENT DOCUMENTS

| | | |
|---|---|---|
| DE | 198 35 837 A1 | 2/2000 |
| EP | 1 501 165 A1 | 1/2005 |

\* cited by examiner

*Primary Examiner* — Tan Le
(74) *Attorney, Agent, or Firm* — Hogan Lovells US LLP

(57) ABSTRACT

An auxiliary support case for at least one piece of electrical equipment to be wall-mounted is described, such that a mounting seat is defined, which is suitable to receive and hold said at least one piece of electrical equipment. The support case can be removably fixed to a wall-mounted case according to at least two different positions, thereby allowing respective orientations to said at least one piece of electrical equipment.

18 Claims, 6 Drawing Sheets

US 8,383,937 B2

AUXILIARY SUPPORT CASE FOR AT LEAST ONE PIECE OF ELECTRICAL EQUIPMENT

CROSS-REFERENCE TO RELATED APPLICATIONS

The present application is a national filing in the U.S. Patent & Trademark Office of PCT/IT2006/000354 filed May 12, 2006, and claims priority of Italy Patent Application No. RM2005A000895 filed May 17, 2005, both of which applications are incorporated herein in their entireties by this reference.

FIELD OF THE INVENTION

The present invention relates to the field of electrical systems for dwellings and offices, and more particularly, relates to a support case for wall-mounting one or more pieces of electrical equipment.

BACKGROUND OF THE INVENTION

To the purposes of the present invention, by "electrical equipment" is generally meant any means or electrical device being generally a part of electrical installations in civil buildings and the like, and which is usually intended to be mounted, for example embedded, to walls of said buildings. Accordingly, this term includes, in a non-limiting manner, switches, power sockets, data outlets, TV sockets, phone sockets, push-buttons, switches, diverter switches, general control electrical devices, connectors, thermostats, timers, fuse carriers, bells/buzzers, emergency lamps, such as removable ones, signaling lamps such as step lights, displays such as LCDs, and the like.

Most of the above-mentioned electrical equipment is known to be usually wall-mounted using assembly kits, which generally include:

- a box intended to be embedded in the wall;
- an equipment mounting case (for brevity, called the "mounting case" herein below) to be fixed to the box and comprising a case body developing about a window that defines a mounting seat suitable to receive and hold one or more pieces of electrical equipment; and
- a cover plate being removably fixable to the case and provided with an opening to allow a user to gain access, either visually or manually, to the electrical equipment installed on the support case.

Prior art mounting cases are currently suitable to accommodate a piece of electrical equipment or a combination set of modular electrical equipment being placed side by side to each other. Particularly, conventional wall-mounted cases have the drawback of strongly limiting the number of configurations with which electrical equipment can be mounted. For example, several types of power sockets (the so-called SCHUKO) are available, the electrical plugs matching therewith having such a shape that, when they have been inserted in the respective sockets, they have portions overlapping, at least partially, the adjacent electrical equipment. This may prevent the user from being able to insert the corresponding plug in an adjacent socket, to easily press a switch or read a display that may also be mounted on the same case.

Accordingly, prior art cases have low flexibility relative to the positioning of several types of electrical equipment being available on the market.

SUMMARY OF THE INVENTION

The object of the present invention is to provide a mounting structure having a greater flexibility than that offered by prior art cases, in relation with the various positioning requirements of the electrical equipment to be accommodated within the mounting seat.

This object is achieved by means of the support case such as defined and characterized in claim 1.

Preferred embodiments are as defined in the dependent claims 2-13.

The object of the present invention is also a set of parts for wall-mounting electrical equipment such as defined in claim 14.

BRIEF DESCRIPTION OF THE DRAWINGS

The invention will be better understood from the following detailed description of an embodiment thereof, which is given by way of example with reference to the annexed figures, in which.

DETAILED DESCRIPTION OF PREFERRED EMBODIMENTS

In the figures, equal or similar elements will be designated with the same numerals.

Figure 1:
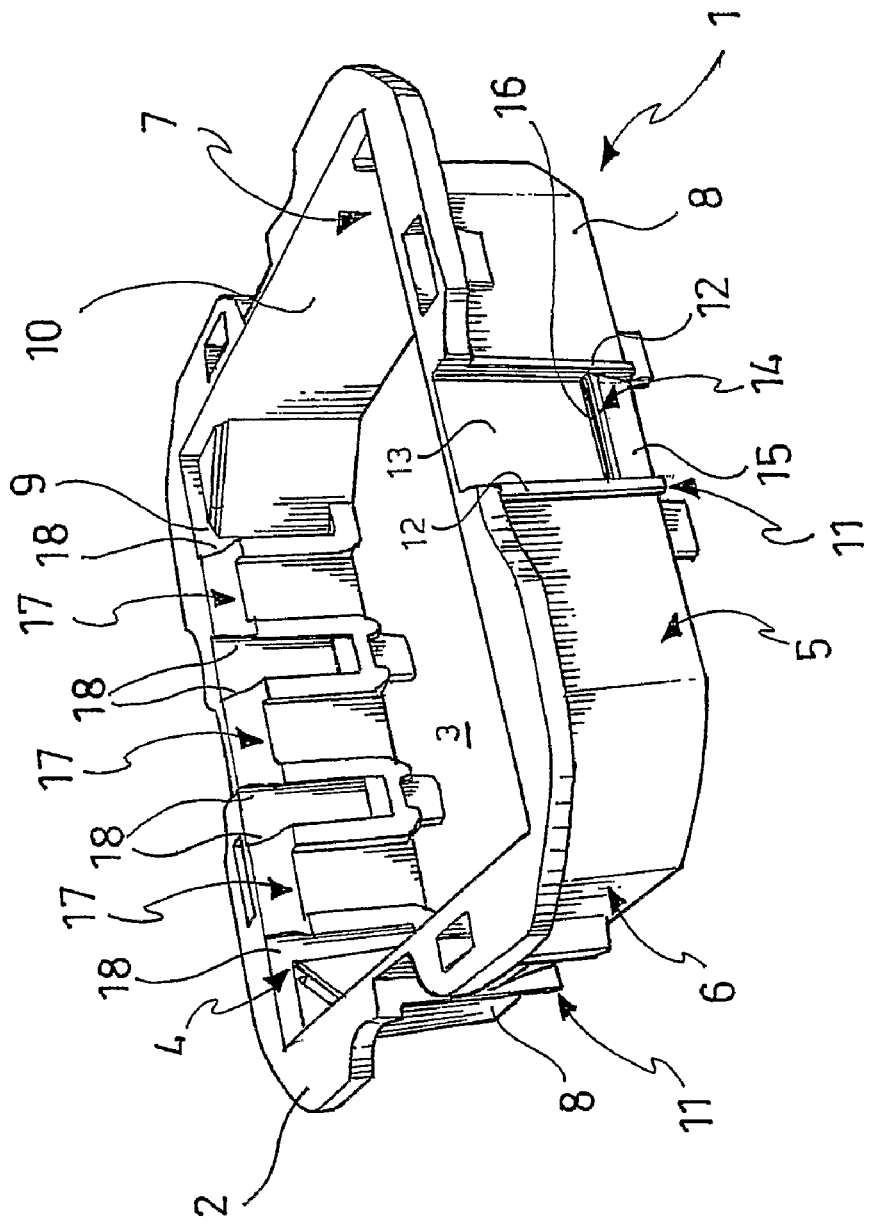
FIG. 1 is a top perspective view of an exemplary support case according to the invention.
Figure 2:
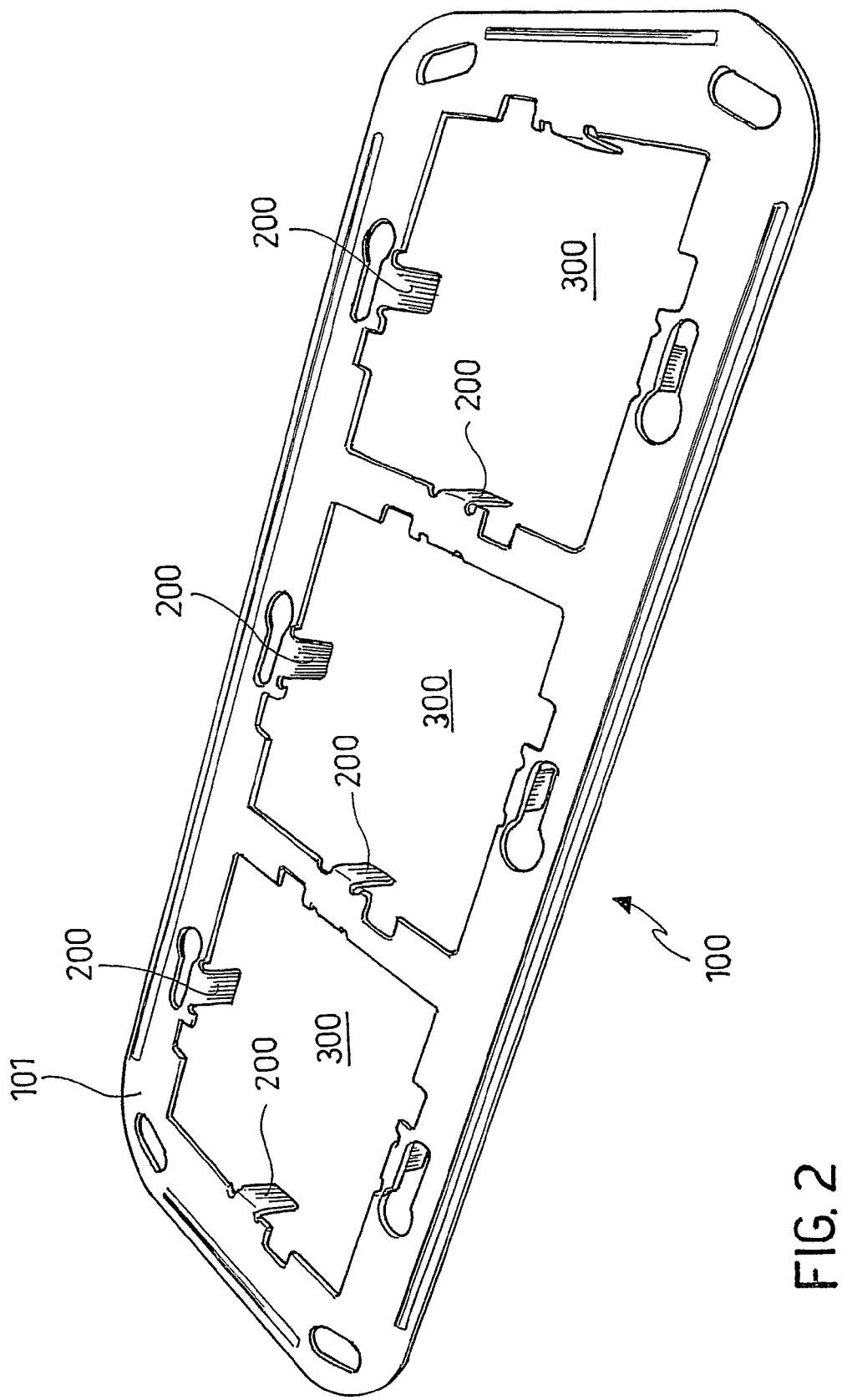
FIG. 2 is a top perspective view of an exemplary wall-mounted case to be coupled to the mounting case of FIG. 1.
Figure 3:
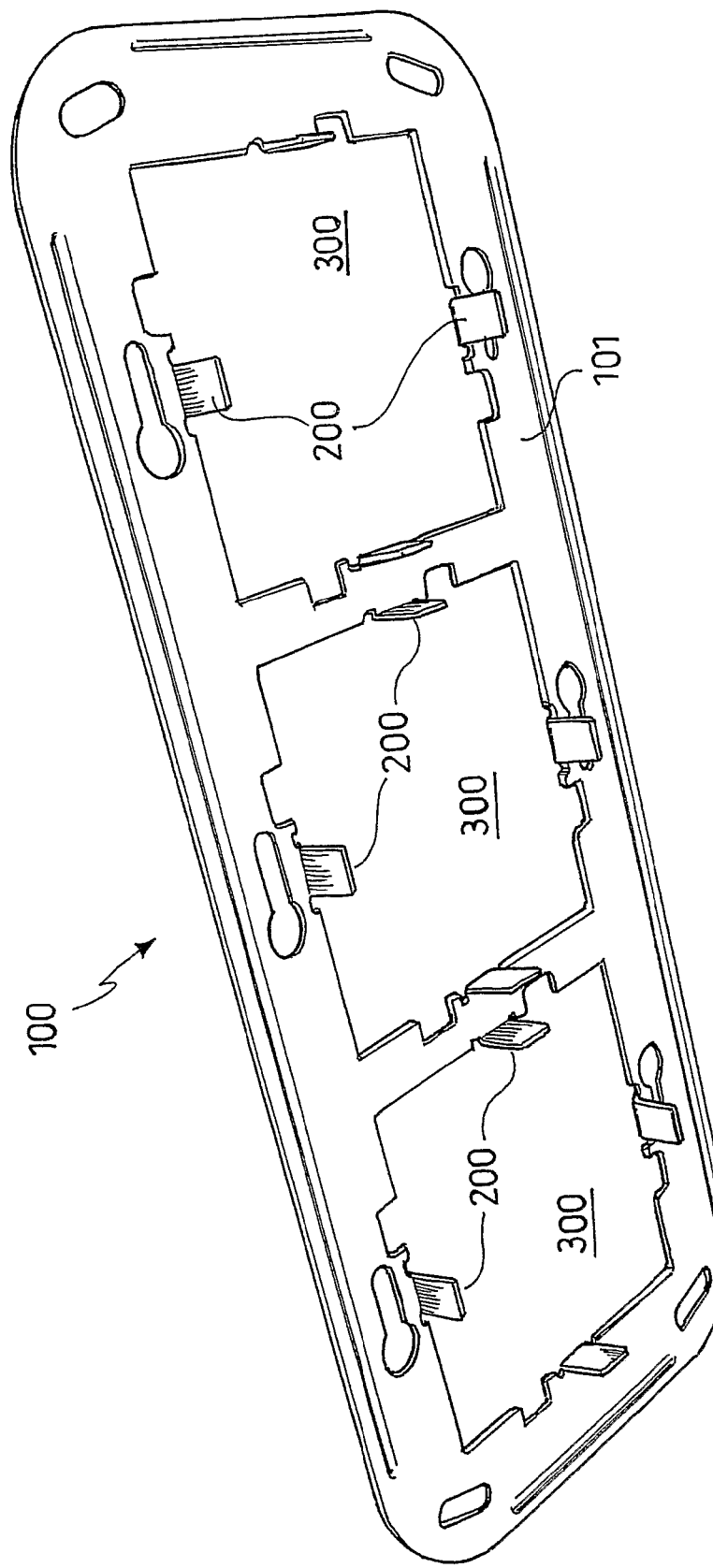
FIG. 3 is a bottom perspective view of the wall-mounted case of FIG. 2.

In FIG. 1, there is shown a top perspective view of an exemplary support case 1 in accordance with the present invention to be used as an auxiliary case to be associated with a wall-mounted case 100 (shown in FIGS. 2 and 3).

The support case 1 consists of a frame body 2 developing about a window 3 defining a mounting seat suitable to receive and hold at least one piece of electrical equipment.

The window 3 is sized such as to be capable of accommodating one piece of electrical equipment or a combination of modular electrical equipment being placed side by side to each other. This can be achieved since conventional electrical equipment has a first dimension being substantially identical to a whole multiple of a basic modular dimension and a second dimension being variable and equal thereto.

Figure 6B:
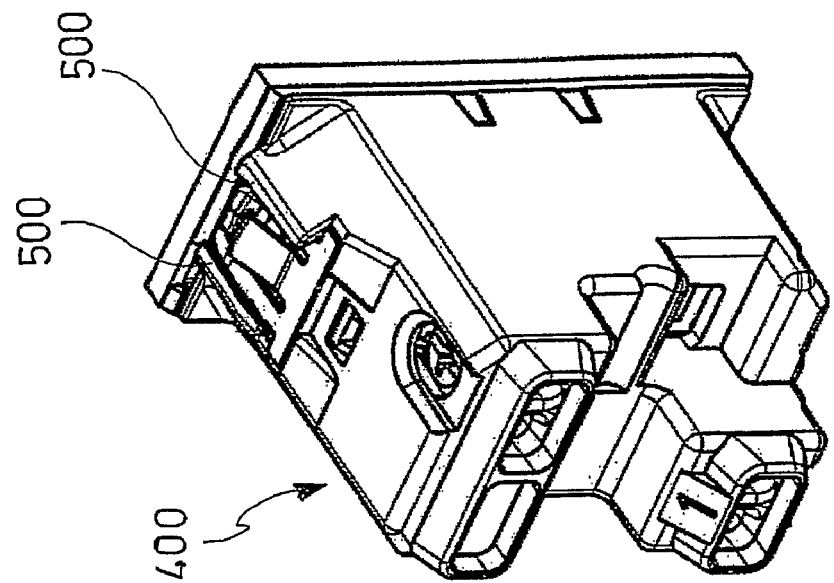
FIGS. 6a and 6b show two different perspective views of a piece of electrical equipment to be mounted to the support case according to the invention.
Figure 6A:
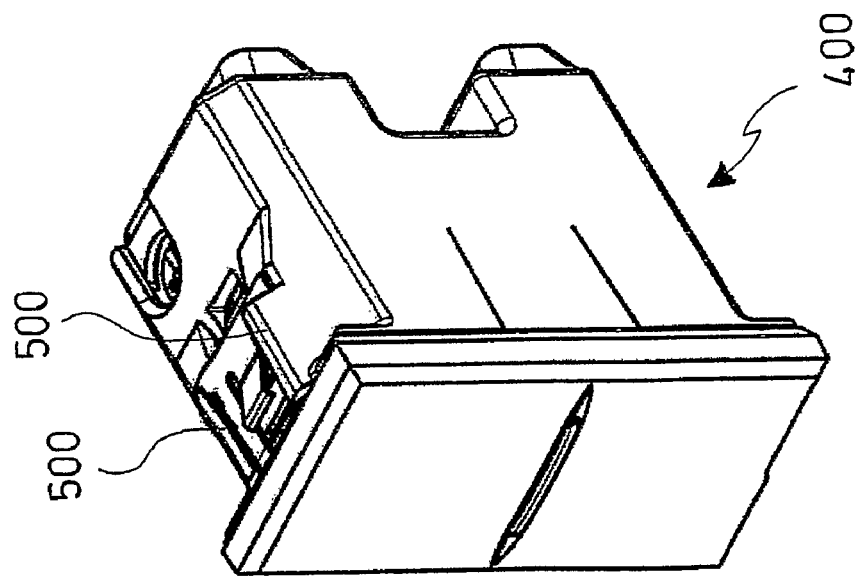

In the example reported herein, the mounting seat 3 is sized to accommodate a piece of electrical equipment of the so-called "two-module" type, i.e. having the second dimension twice as large as the basic modular dimension or two pieces of electrical equipment of the so-called "one-module" type, placed side by side. By one-module electrical equipment is meant a piece of electrical equipment having the second dimension equal to the basic modular dimension. An example of a one-module piece of electrical equipment is shown in FIGS. 6a and 6b and is generally indicated with numeral 400.

The body 2 of the support case 1 is preferably made of insulating material and is substantially shaped like a frame with a substantially rectangular plan with rounded angles.

The frame body 2 is defined by a first pair of counter-posed walls 4 and 5 and a second pair of counter-posed walls 6 and 7 having the ends joined to the walls of the first pair. The first pair of walls 4 and 5 is substantially orthogonal to the second pair of walls 6 and 7. Each wall of the first and second pairs has an inner face and an outer face. In the figures, the outer faces of all the walls have the same numeral 8. The inner faces of the counter-posed walls 4 and 5 of the first pair are designated with numeral 9 whereas the inner faces of the walls 6 and 7 of the second pair are designated with numeral 10.

A fixing element 11 is associated with each of the outer faces 8, which is suitable to allow a coupling, preferably of the snap type, between the support case 1 and the wall-mounted case 100. The fixing element 11 is, such as in the example described herein, in a central area of the respective face.

The fixing element 11 comprises, for example, a pair of ribs 12 being substantially parallel to each other, which define a coupling channel 13 substantially perpendicular to each of the outer faces 8 and suitable to allow a matching fixing element to slide therein, which is provided on the mounting case 100, until it reaches the snap-attachment position. Particularly, this complementary fixing element is a tab 200 projecting from the wall-mounted case 100, such as shown in FIGS. 2 and 3.

To facilitate the coupling between the support case 1 and the wall-mounted case 100, a tooth 14 is developed orthogonal to the coupling channel 13, such that an accommodating region for the tab 200 is defined in the snap-attachment position.

The tooth 14 advantageously consists of an inclined plane 15 parallel to the pair of ribs 12 to facilitate the tab 200 sliding on said inclined plane and an abutment plane 16, which is perpendicular to the pair of ribs 12, to allow the tab 200 to stop.

Advantageously, the abutment plane 16 is suitable to further prevent any relative movement of the support case 1 with respect to the wall-mounted case 100 in the direction parallel to the coupling channel 13, after it has reached the attachment position.

At least one of the first 4, 5 and second 6, 7 pairs of counter-posed walls provides, on the inner faces 9, attachment means 17 to allow electrical equipment 400 to be mounted to the support case 1.

In the example in the figures, the attachment means 17 are associated with the inner faces 9 of the pair of walls 4 and 5, whereas the inner faces 10 of the pair of walls 6 and 7 have no additional element associated therewith, but only have the function of joining the walls of the first pair.

Particularly, the attachment means 17 are such as to cooperate with corresponding counter-shaped attachment elements being provided on opposite sides of the electrical equipment 400 to be attached to the support case 1. Preferably, the fixing means 17 include seats 18 suitable to receive respective fixing tabs 500 of the electrical equipment 400.

The wall-mounted case 100 has a main body 101 that, in the example described herein, runs around three windows 300 that define respective seats, each being suitable to accommodate a support case 1 such as described above. More generally, the body 101 can run around one or more windows.

The body 101 of the mounting frame 100 is preferably made of sheet metal and is substantially shaped as a frame. Still more preferably, this body is approximatively shaped as a plate-like frame and preferably has a rectangular plan. Particularly, the body 101 has a first dimension (length) and a second dimension (width) that are joined to each other with rounded angles, such as in the example from FIGS. 3 and 4. Since three windows 300 placed side by side have to be included, each being capable of accommodating a support case 1, the first dimension of the body 101 is about three times as large as the second dimension.

Each of the windows 300 is defined by respective edges, respective tabs 200 being associated therewith. To ensure the coupling between the support case 1 and the mounting case 100, the position of the fixing elements 12 on each of the outer faces 8 of the walls of the support case 1 is required to match the position of each of the tabs 200 relative to the edge of the respective window 300. In the example described herein, the fixing elements 12 are in the center of the respective walls, thus, such as shown in FIGS. 2 and 3, the tabs 200 are formed in the center of the corresponding edge.

This allows the support case 1 to be snap-attached to the body 101 such that the pair of counter-posed walls 5 and 6, on the inner faces of which there are provided the attaching means 17 to receive the electrical equipment, are parallel, or alternatively, perpendicular to the lower dimension of the mounting case 100.

The first position, pair of walls 5 and 6 parallel to the lower dimension of the mounting case 100, corresponds to a first possible orientation of electrical equipment (a two-module piece of electrical equipment, or two different one-module pieces of electrical equipment placed side by side) such that the latter have their greater dimension parallel to the greater dimension of the mounting case 100.

The second position, pair of walls 5 and 6 orthogonal to the lower dimension of the mounting frame 100, corresponds to a second possible orientation of electrical equipment in which the latter have the greater dimension orthogonal to the greater dimension of the support case 100.

When the wall-mounted case 100 is fixed such as to have, for example, the greater dimension orthogonal to the floor ground of a building, the electrical equipment, in the case of the first orientation, is parallel to the floor and thus installed in a horizontal manner. On the other hand, in the case of the second orientation, the electrical equipment is vertical to the floor and can be said to be vertically installed.

Figure 4:
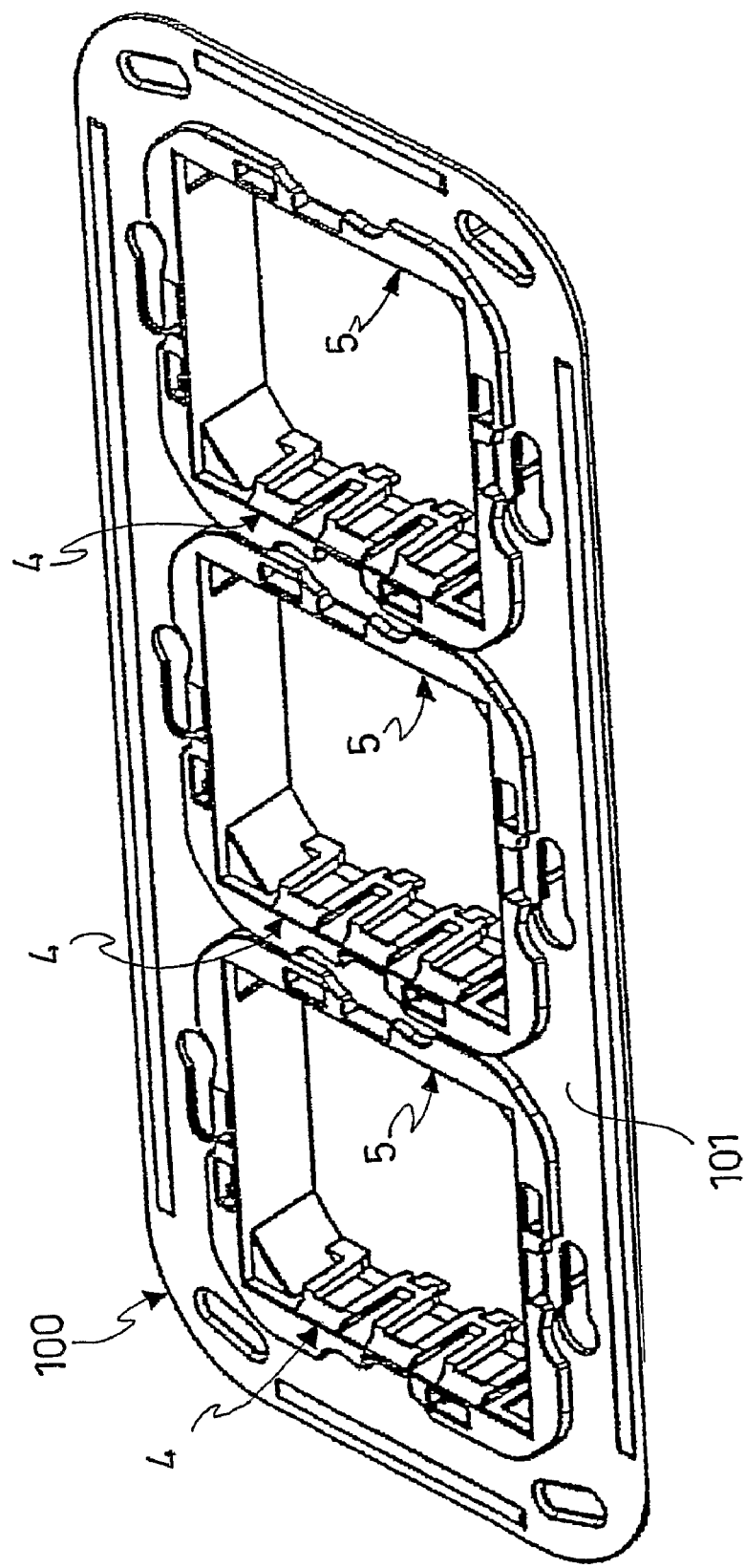
FIG. 4 is a top perspective view of the wall-mounted case from FIG. 2 as shown together with three support cases, each being like that in FIG. 1.
Figure 5:
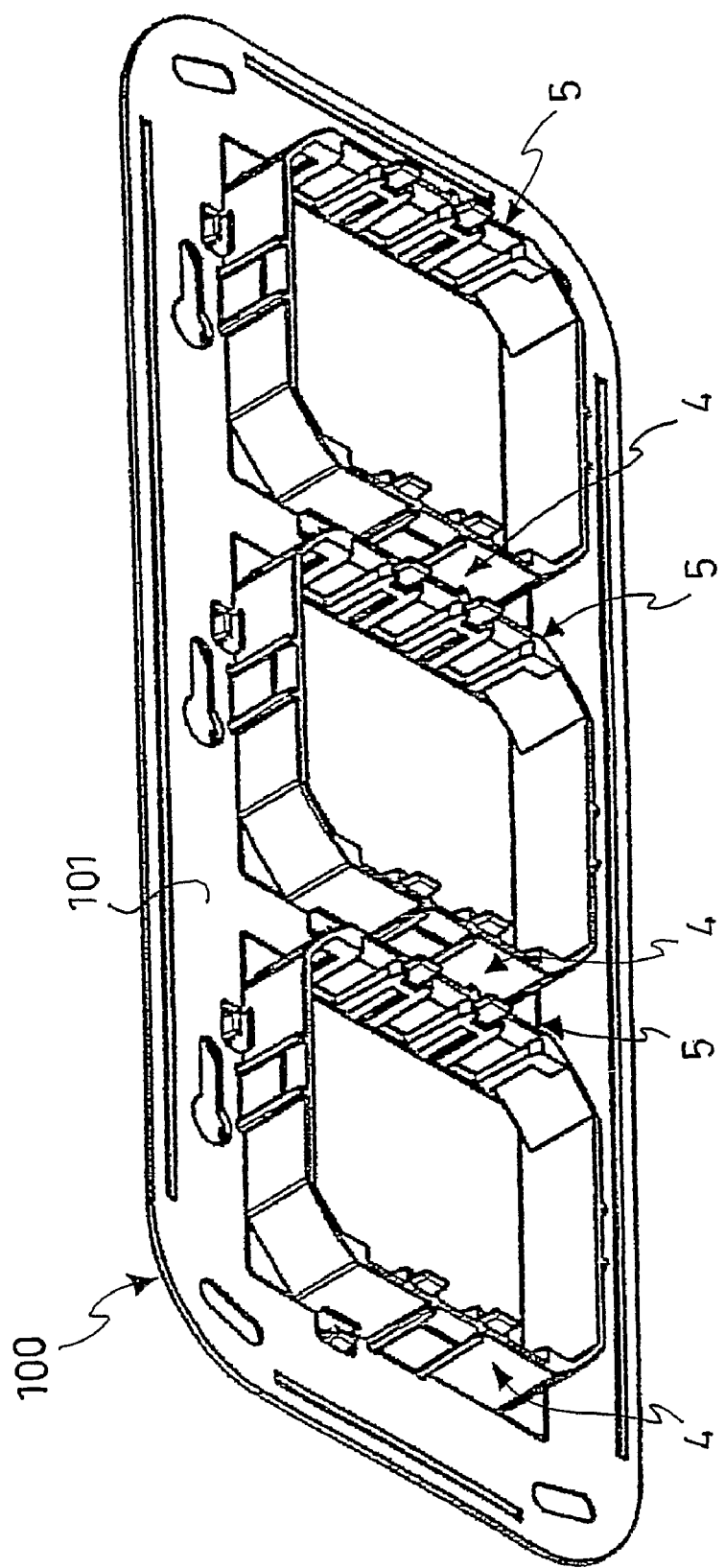
FIG. 5 is a bottom perspective view of the mounting structure of FIG. 4.

In FIGS. 4 and 5, the support cases 1 are all fixed to the mounting case 100 according to the same orientation, i.e. such that the pair of walls 5 and 6 is parallel to the greater dimension of the support case.

It should be understood that each support case 1 can be attached on a same wall-mounted case 100 according to one of the first orientation and the second orientation regardless of the orientation of the other support cases.

A plurality of possible combinations is available between the first and second orientations of each of the support cases 1, and they increase as the number of cases that can be accommodated within the wall-mounted case 100 increases, and obviously depend on the installer's requirements and the type of electrical equipment being used.

As may be seen in FIG. 2-5, the wall-mounted case 100 includes wall-fixing means being, for example, through holes, preferably slotted, which are suitable to receive respective screws to fix the mounting case 100, for example, to a box embedded in the wall.

The body 101 further comprises coupling means for cover plate, not shown in the figures, to be associated to the mounting case 100. These coupling means are, for example, channels or seats for coupling with respective fixing tabs provided in the cover plate.

The function of this plate, as is known to those skilled in the art, is both to ensure a minimum protection to the electrical equipment, and prevent any access to the electrically conductive parts of the electrical equipment. Another major task assigned to the cover plates is to mask flaws due to a cavity being present in the wall and an optional further box.

As may be seen, the object of the invention is fully achieved since the auxiliary case described herein can be associated to the wall-mounted case in two different positions, which correspond to two different orientations of the electrical equipment to be attached to said case. This allows having that flexible orientation for the pieces of electrical equipment to be placed side by side on the same case such as to meet the installer's or user's requirements.

Furthermore, the solution provided herein has the advantage that each support case 1 can be easily mounted to the respective wall-mounted case 100, particularly due to the use of the snap fitting. In fact, the snap fitting allows the operations required for mounting the electrical equipment to be facilitated and accelerated.

Still more advantageously, due to the fact that each support case is removable from the wall-mounted case, the installer or user can easily modify the orientation of the electrical equipment, such that power plugs having particular shapes can be accommodated, displays can be visualized or switches can be made accessible.

The invention claimed is:

1. An assembly kit for wall-mounting at least one piece of electrical equipment comprising:
    a wall-mounted frame provided with a body defining at least one fixing opening and including first fixing elements; and
    a support case including fixing means arranged to engage to said first fixing elements of said wall-mounted frame, wherein said support case and said wall-mounted frame when engaged together form a through-hole into which said at least one piece of electrical equipment can be inserted, such that said at least one piece of electrical equipment can be accessed through a front of said through-hole and a rear of said through-hole, said support case comprising further fixing means to receive and hold said at least one piece of electrical equipment, whereby said support case is distinct from said at least one piece of electrical equipment;
    wherein said support case further comprises a frame body having a window defining a mounting seat, with said fixing means being distributed on the frame body to allow positioning the support case to the wall-mounted frame according to at least a first position and a second position, wherein the first position is orthogonal to the second position.

2. The assembly kit according to claim 1, wherein the frame body comprises a first pair of opposed walls and a second pair of opposed walls having ends connected to the walls of said first pair.

3. The assembly kit according to claim 2, wherein the frame body is substantially rectangular and the first pair of walls is orthogonal to the second pair of walls.

4. The assembly kit according to claim 3, wherein said fixing means comprise at least one fixing element placed at an outer side to the seat of each wall of said first and second pairs.

5. The assembly kit according to claim 4, wherein said at least one fixing element is substantially at a central area of the outer face to which it is associated.

6. The assembly kit according to claim 4, wherein said at least one fixing element is suitable to allow the snap-fitting of the support case to the wall-mounted frame.

7. The assembly kit according to claim 6, wherein said at least one snap-fixing element comprises a pair of ribs substantially perpendicular to the respective wall and define a coupling channel for a complementary fixing element provided on the wall-mounted frame to slide therein.

8. The assembly kit according to claim 7, wherein said snap-fixing element further comprises stop means being defined within the coupling channel and suitable to be engaged, in a snap-attachment position, with said first fixing elements being provided on the wall-mounted frame.

9. The assembly kit according to claim 8, wherein said first fixing elements comprise a tab projecting from the wall-mounted frame and the stop means comprise a tooth developing orthogonally to said coupling channel such that a region for accommodating the tab is defined in the attachment position, said tooth having an inclined plane, substantially parallel to the pair of ribs, suitable to facilitate the sliding of the tab and an abutment plane, substantially perpendicular to the pair of ribs, suitable to allow the tab to stop.

10. The assembly kit according to claim 9, wherein each wall of at least one of said first and second pairs comprises, on a respective inner face, attaching means for mounting said at least one piece of electrical equipment.

11. The assembly kit according to claim 10, wherein the attachment means include seats suitable to receive fixing tabs being provided on opposite sides of said at least one piece of electrical equipment.

12. The assembly kit according to claim 1, wherein said support case is arranged to be fixed to the wall-mounted frame in a removable manner.

13. The assembly kit according to claim 2, wherein said support case is arranged to be fixed to the wall-mounted frame in a removable manner.

14. The assembly kit according to claim 3, wherein said support case is arranged to be fixed to the wall-mounted frame in a removable manner.

15. The assembly kit according to claim 4, wherein said support case is arranged to be fixed to the wall-mounted frame in a removable manner.

16. The assembly kit according to claim 5, wherein said support case is arranged to be fixed to the wall-mounted frame in a removable manner.

17. The assembly kit according to claim 6, wherein said support case is arranged to be fixed to the wall-mounted frame in a removable manner.

18. The assembly kit according to claim 7, wherein said support case is arranged to be fixed to the wall-mounted frame in a removable manner.

* * * * *